(12) United States Patent
Perreault et al.

(10) Patent No.: US 10,764,552 B2
(45) Date of Patent: Sep. 1, 2020

(54) NEAR-EYE DISPLAY WITH SPARSE SAMPLING SUPER-RESOLUTION

(71) Applicant: Google LLC, Mountain View, CA (US)

(72) Inventors: John D. Perreault, Mountain View, CA (US); Patrick Llull, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

(21) Appl. No.: 15/897,611

(22) Filed: Feb. 15, 2018

(65) Prior Publication Data

US 2018/0343434 A1 Nov. 29, 2018

Related U.S. Application Data

(60) Provisional application No. 62/511,561, filed on May 26, 2017.

(51) Int. Cl.
| | | |
|---|---|---|
| *H04N 13/117* | (2018.01) | |
| *G02B 27/01* | (2006.01) | |
| *H04N 13/307* | (2018.01) | |
| *H04N 13/332* | (2018.01) | |
| *H04N 13/383* | (2018.01) | |

(Continued)

(52) U.S. Cl.
CPC ....... *H04N 13/117* (2018.05); *G02B 27/0172* (2013.01); *G06T 15/005* (2013.01); *H04N 13/307* (2018.05); *H04N 13/332* (2018.05); *H04N 13/383* (2018.05); *G02B 3/0006* (2013.01); *G02B 5/005* (2013.01);

(Continued)

(58) Field of Classification Search
CPC .. G02B 27/2214; G02B 27/017; G06T 3/4053
See application file for complete search history.

(56) References Cited

U.S. PATENT DOCUMENTS 8,493,390 B2 7/2013 Kalinli
9,582,922 B2 2/2017 Lanman et al.
(Continued)

FOREIGN PATENT DOCUMENTS

WO 2015081313 A2 6/2015

OTHER PUBLICATIONS

International Search Report and Written Opinion dated May 14, 2018 for corresponding International Application No. PCT/US2018/018434, 18 pages.

(Continued)

*Primary Examiner* — Haixia Du

(57) ABSTRACT

A near-eye display system includes display panel to display a near-eye lightfield frame comprising an array of elemental images and a lenslet array to present the integral lightfield frame to a user's eye. The system further includes a rendering component to generate an array of elemental images based at least in part on a sparse sampling of a source image to decrease an overlap of image data contained within each individual elemental of the array of elemental images. A method of operation of the near-eye display system includes generating an array of elemental images forming the integral lightfield frame based on a sparse sampling of the current viewpoint of the subject object to decrease an overlap of image data contained within each individual elemental image of the array.

21 Claims, 8 Drawing Sheets

(51) Int. Cl.
  *G06T 15/00* (2011.01)
  *G02B 3/00* (2006.01)
  *G02B 5/00* (2006.01)
  *G02B 30/26* (2020.01)

(52) U.S. Cl.
  CPC ...... *G02B 30/26* (2020.01); *G02B 2027/0118* (2013.01); *G02B 2027/0178* (2013.01)

(56) References Cited

U.S. PATENT DOCUMENTS

| | | | |
|---|---|---|---|
| 2007/0097277 A1* | 5/2007 | Hong | G02B 3/14 349/11 |
| 2007/0153159 A1* | 7/2007 | Jung | G02B 6/0068 349/69 |
| 2010/0208494 A1* | 8/2010 | Kuo | G02B 6/002 362/612 |
| 2013/0128087 A1 | 5/2013 | Georgiev et al. | |
| 2014/0340390 A1* | 11/2014 | Lanman | G06T 15/04 345/419 |
| 2015/0177514 A1 | 6/2015 | Maimone et al. | |
| 2016/0349603 A1* | 12/2016 | Chang | G03B 21/10 |
| 2017/0038590 A1 | 2/2017 | Jepsen | |
| 2017/0132757 A1 | 5/2017 | Thiebaud et al. | |
| 2017/0147034 A1 | 5/2017 | Lanman et al. | |
| 2018/0024628 A1* | 1/2018 | Kim | G09G 3/3208 345/156 |
| 2018/0091800 A1* | 3/2018 | Ratcliff | H04N 13/305 |

OTHER PUBLICATIONS

English translation of Taiwanese Office Action dated Mar. 19, 2019 for corresponding Taiwanese Application No. 107107795, 4 pages.

Ju-Seog Jang and Bahram Javidi, "Improvement of viewing angle in integral imaging by use of moving lenslet arrays with low fill factor," Applied Optics, Apr. 10, 2003, vol. 42, No. 11, 7 pages.

Douglas Lanman and David Luebke, "Near-Eye Light Field Displays," 2013.

International Preliminary Report on Patentability dated Dec. 5, 2019 for corresponding International Application No. PCT/US2018/018434, 10 pages.

* cited by examiner

NEAR-EYE DISPLAY WITH SPARSE SAMPLING SUPER-RESOLUTION

CROSS REFERENCE TO RELATED APPLICATIONS

This application is related to U.S. Provisional Patent Application 62/511,561, entitled "NEAR-EYE DISPLAY WITH SPARSE SAMPLING SUPER-RESOLUTION" and filed on May 26, 2017, the entirety of which is incorporated by reference herein.

BACKGROUND

Head-mounted displays (HMDs) and other near-eye display systems can utilize an integral lightfield display or other computational display to provide effective display of three-dimensional (3D) graphics. Generally, the integral lightfield display employs one or more display panels and an array of lenslets, pinholes, or other optic features that overlie the one or more display panels. A rendering system renders an array of elemental images, with each elemental image representing an image or view of an object or scene from a corresponding perspective or virtual camera position. Such integral lightfield displays typically exhibit a tradeoff between resolution and eye relief (i.e., distance from which the user's eye can obtain a full field of view). Conventional near-eye display system employing an integral lightfield display typically sacrifice spatial resolution due to overlap in the lenslet projector-array.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate example methods and systems for sparse sampling super-resolution rendering of integral lightfield frames in a near-eye display system. In at least one embodiment, the near-eye display system employs a computational display to display integral lightfield frames of imagery to a user so as to provide the user with an immersive virtual reality (VR) or augmented reality (AR) experience. Each integral lightfield frame is composed of an array of elemental images, with each elemental image representing a view of an object or scene from a different corresponding viewpoint. An array of lenslets overlies the display panel and operates to present the array of elemental images to the user as a single autostereoscopic image.

As the resolution of computational displays exhibit a tradeoff between resolution and eye relief (i.e., distance from which the user's eye can obtain a full field of view), near-eye display systems employing an integral lightfield display typically sacrifice spatial resolution due to overlap in the lenslet projector-array. To provide improved resolution, in at least one embodiment the near-eye display systems described herein utilize sparse sampling of low fill-factor displays to recover some of the lost resolution by removing the overlap in image data within projector array elements. As an example, each of the projector array elements may be configured to sample a slightly different sub-region of a source image, and therefore have unique image data relative to one another. Accordingly, a sparse sampling of the source image can be obtained by the low fill-factor display to decrease the overlap of image data received at the lenslet projector-array and recover lost spatial resolution resulting from the decreased viewing distance of near-eye systems (e.g., less than 10 millimeters (mm) vs. the 10-40 mm lens focal length of conventional light field displays vs 40+ mm for conventional magnifier displays).

Figure 1:
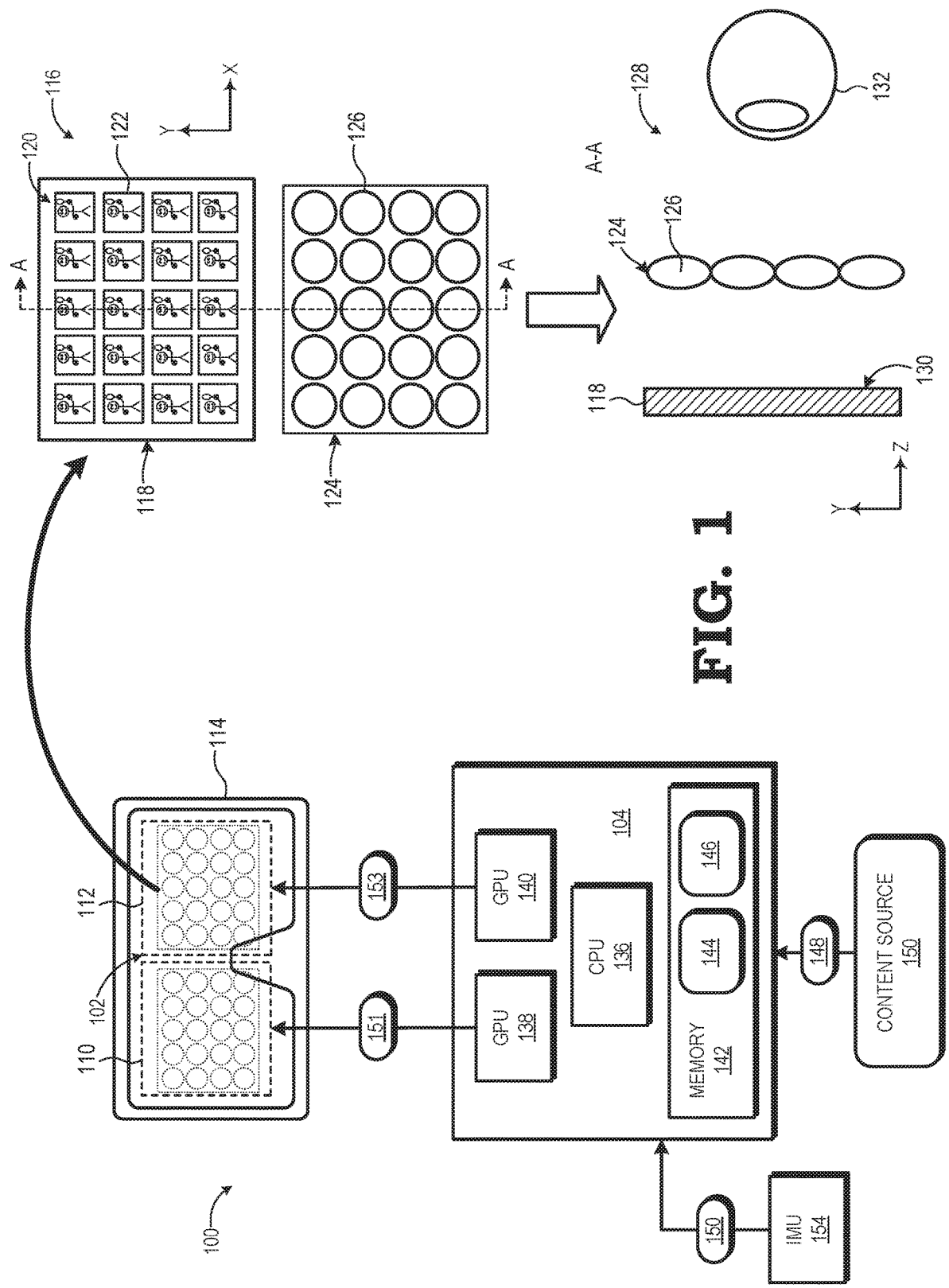
FIG. 1 is a diagram illustrating a near-eye display system employing pose detection and sparse sampling to provide increased display resolution in accordance with some embodiments.

FIG. 1 illustrates a near-eye display system 100 incorporating sparse sampling super-resolution rendering of integral lightfield frames in accordance with at least one embodiment. In the depicted example, the near-eye display system 100 includes a computational display sub-system 102 and a rendering component 104. The computational display sub-system 102 includes a left-eye display 110 and a right-eye display 112 mounted in an apparatus 114 (e.g., goggles, glasses, etc.) that places the displays 110, 112 in front of the left and right eyes, respectively, of the user.

As shown by view 116, each of the displays 110, 112 includes at least one display panel 118 to display a sequence or succession of integral lightfield frames (hereinafter, "lightfield frame" for ease of reference), each of which comprises an array 120 of elemental images 122. For ease of reference, an array 120 of elemental images 122 may also be referred to herein as a lightfield frame 120. Each of the displays 110, 112 further includes an array 124 of lenslets 126 (also commonly referred to as "microlenses") overlying the display panel 118. Typically, the number of lenslets 126 in the lenslet array 124 is equal to the number of elemental images 122 in the array 120, but in other implementations the number of lenslets 126 may be fewer or greater than the number of elemental images 122. Note that while the example of FIG. 1 illustrates a 5×4 array of elemental images 122 and a corresponding 5×4 array 120 of lenslets 126 for ease of illustration, in a typical implementation the number of elemental images 122 in a lightfield frame 120 and the number of lenslets 126 in the lenslet array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 128 of FIG. 1 depicts a cross-section view along line A-A of the lenslet array 124 overlying the display panel 118 such that the lenslet array 124 overlies the display surface 130 of the display panel 118 so as to be disposed between the display surface 130 and the corresponding eye 132 of the user. In this configuration, each lenslet 126 focuses a corresponding region of the display surface 130 onto the pupil 134 of the eye, with each such region at least partially overlapping with one or more adjacent regions. Thus, in such computational display configurations, when an array 120 of elemental images 122 is displayed at the display surface 130 of the display panel 118 and then viewed by the eye 132 through the lenslet array 124, the user perceives the array 120 of elemental images 122 as a single image of a scene. Thus, when this process is performed in parallel for both the left eye and right eye of the user with the proper parallax implemented therebetween, the result is the presentation of autostereoscopic three-dimensional (3D) imagery to the user.

As also shown in FIG. 1, the rendering component 104 includes a set of one or more processors, such as the illustrated central processing unit (CPU) 136 and graphics processing units (GPUs) 138, 140 and one or more storage components, such as system memory 142, to store software programs or other executable instructions that are accessed and executed by the processors 136, 138, 140 so as to manipulate the one or more of the processors 136, 138, 140 to perform various tasks as described herein. Such software programs include, for example, rendering program 144 comprising executable instructions for a sparse sampling process, as described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 136 uses the rendering information 148 to send drawing instructions to the GPUs 138, 140, which in turn utilize the drawing instructions to render, in parallel, a series of lightfield frames 151 for display at the left-eye display 110 and a series of lightfield frames 153 for display at the right-eye display 112 using any of a variety of well-known VR/AR computational/lightfield rendering processes. As part of this rendering process, the CPU 136 may receive pose information 150 from an inertial management unit (IMU) 154, whereby the pose information 150 is representative of a current pose of the display sub-system 102 and control the rendering of one or more pairs of lightfield frames 151, 153 to reflect the viewpoint of the object or scene from the current pose. Although the various embodiments are described here in the context of VR and/or AR displays, those skilled in the art will recognize that the sparse sampling super-resolution rendering systems and methods described as similarly applicable to lightfield camera systems for capturing imagery.

Figure 2:
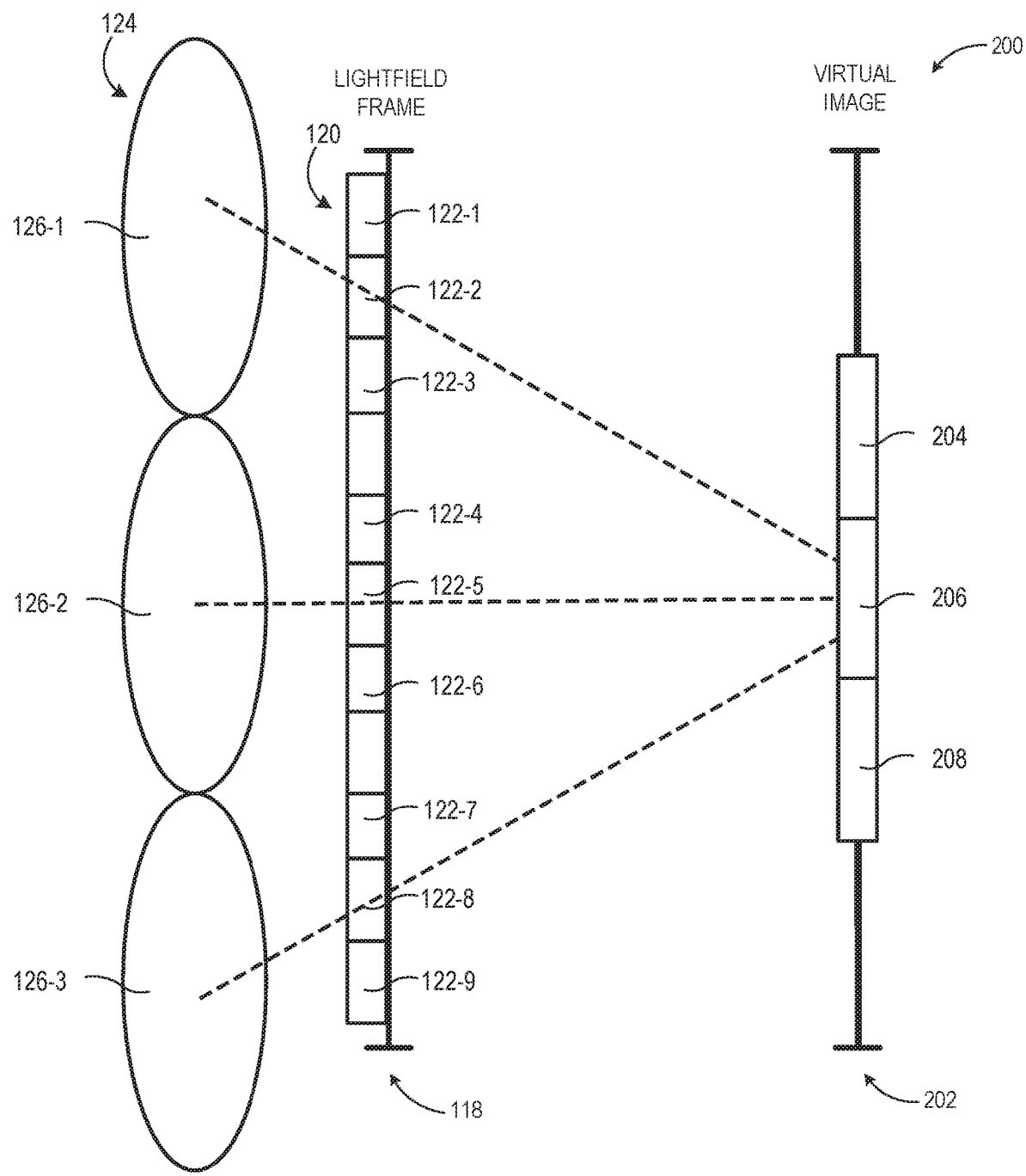
FIG. 2 is a diagram illustrating a conventional computational display in a near-eye display system.

FIG. 2 illustrates a cross-section view 200 of a conventional computational display. Each of the lenslets 126 of the lenslet array 124 serves as a separate "projector" onto an eye of the user (e.g., eye 132 of FIG. 1), with each "projector" overlapping with one or more adjacent projectors in forming a composite virtual image 202 from the array 120 of elemental images 122 displayed at the display panel 118. As shown in this view, the active refracting area (referred to herein as "fill-factor") is nearly 100%. That is, the ratio of area that directs light towards the lenslet array 124 (i.e., the display panel 118) to the total contiguous area occupied by the occupied by the lenslet array including any gaps nears 100%.

Displays with high fill-factors have overlapping data in multiple elemental images 122 from the virtual image 202. To illustrate, the lenslet 126-1 receives image data from elemental image 122-2 corresponding to region 206 of the virtual image 202. Similarly, the lenslet 126-2 receives image data from elemental image 122-5 corresponding to region 206 of the virtual image 202 and the lenslet 126-3 receives image data from elemental image 122-8 corresponding to region 206 of the virtual image 202. Accordingly, the image data received from the elemental images 122-2, 122-5, and 122-8 have large amounts of overlapping information. Conventional displays having high fill-factors often overlap a number of elemental images (e.g., 4-6 elemental images) on the virtual image plane. This overlap results in the reduction of the source resolution by the same factor (i.e., reduction in resolution by 4×-6×).

Figure 3:
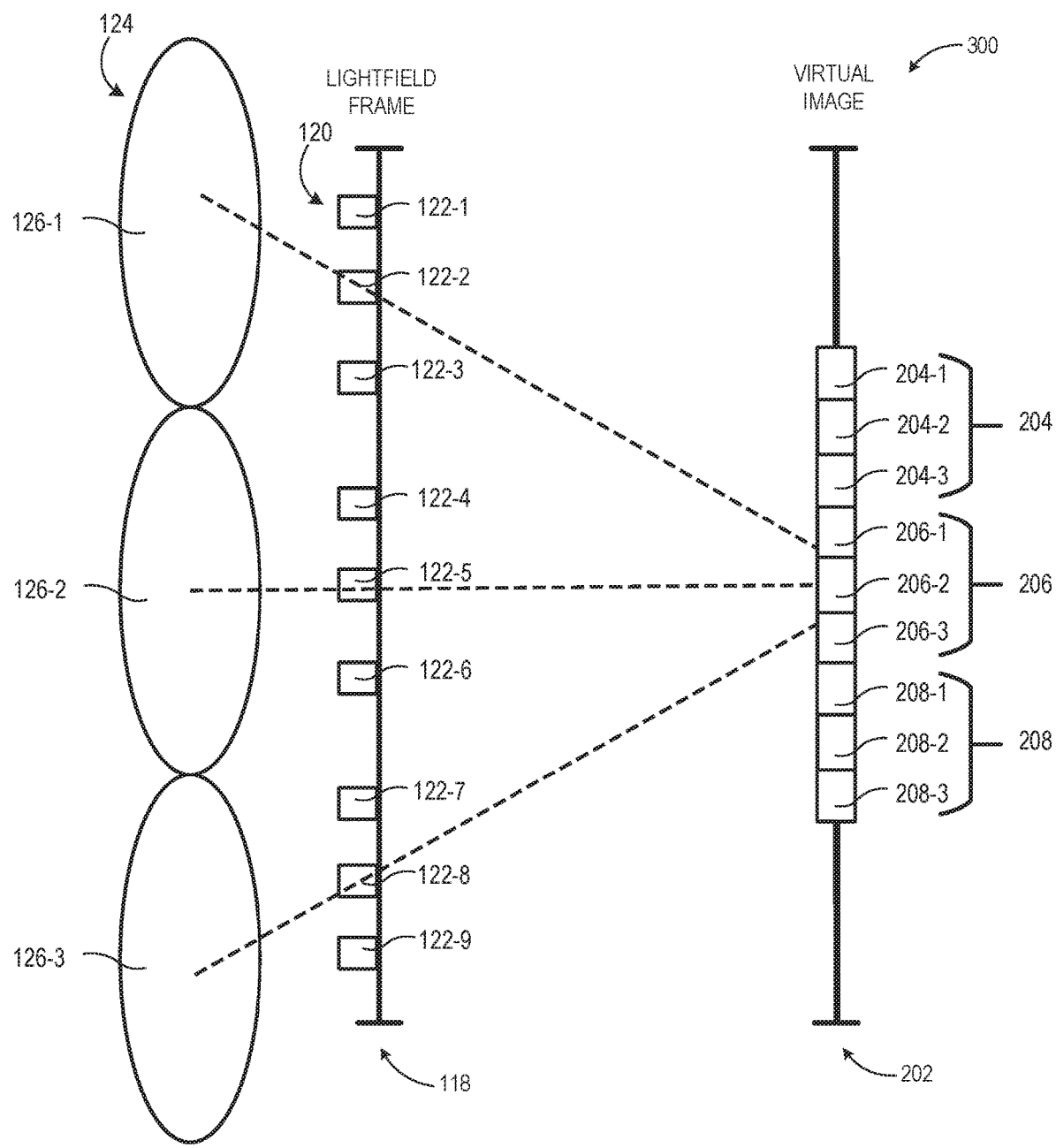
FIG. 3 is a diagram illustrating an example low fill-factor display for use in the near-eye display system of FIG. 1 in accordance with some embodiments.

A portion of the reduction in resolution can be recovered using lower fill-factor displays. FIG. 3 illustrates a cross-section view 300 of a low fill-factor display that may be utilized in the near-eye display system 100 in accordance with some embodiments. Each of the lenslets 126 of the lenslet array 124 serves as a separate "projector" onto an eye of the user (e.g., eye 132 of FIG. 1), with each "projector" overlapping with one or more adjacent projectors in forming a composite virtual image 202 from the array 120 of elemental images 122 displayed at the display panel 118. As shown in this view, the fill-factor is approximately 33%. That is, the ratio of area that directs light towards the lenslet array 124 (i.e., the light emitting elements presenting elemental images 122 of display panel 118) to the total contiguous area occupied by the occupied by the lenslet array including any gaps is approximately 33%.

Displays with lower fill-factors provide a sparse sampling of the source data, such as illustrated in FIG. 3, relative to high fill-factor displays. To illustrate, similar to the high fill-factor display of FIG. 2, the lenslet 126-1 receives image data from elemental image 122-2 corresponding to region 206 of the virtual image 202. Similarly, the lenslet 126-2 receives image data from elemental image 122-5 corresponding to region 206 of the virtual image 202 and the lenslet 126-3 receives image data from elemental image 122-8 corresponding to region 206 of the virtual image 202. However, the lower fill-factor display includes smaller light emitting elements that allow for more discrete attribution of source image data to reduce overlap of image data received at the lenslet array 124.

As shown, the lenslet 126-1 receives image data from elemental image 122-2 corresponding to sub-region 206-1 within region 206 of the virtual image 202. The lenslet 126-2 receives image data from elemental image 122-5 corresponding to sub-region 206-2 within region 206 of the virtual image 202. The lenslet 126-3 receives image data from elemental image 122-8 corresponding to sub-region 206-3 within region 206 of the virtual image 202. Accordingly, while all of the lenslets 126-1, 126-2, and 126-3 take samples from the same local region of the source image (i.e., region 206), the lenslets 126 do not sample image data in the same exact location. Each of the lenslets 126-1, 126-2, and 126-3 sample a slightly different sub-region of the source image, and therefore have unique intensity values (i.e., information content) of the image data relative to one another. Accordingly, a sparse sampling of the virtual image 202 can be obtained by the lower fill-factor display to decrease the overlap of image data received at the lenslets 126 and recover lost resolution by a ratio of 1/(fill-factor). For example, the approximately 33% fill-factor display of FIG. 3 increases resolution of the virtual image 202 by approximately 3× (i.e., 1/0.33 fill-factor).

In various embodiments, the display panel 118 can include light emitting elements that are fabricated with a small fill-factor, such as illustrated in FIG. 3. Such light emitting elements can include, for example, organic light emitting diode (OLED) emitters. However, such light emitting elements are can be limited on their brightness output for a given current density per unit area and fill-factor ratio. In other words, sparse sampling by decreasing the fill-factor to increase virtual image resolution can sometimes have the consequence of lowering the brightness of the display panel 118. This lower brightness is due at least in part on smaller amounts of surface area available for light emitting element output.

Figure 4:
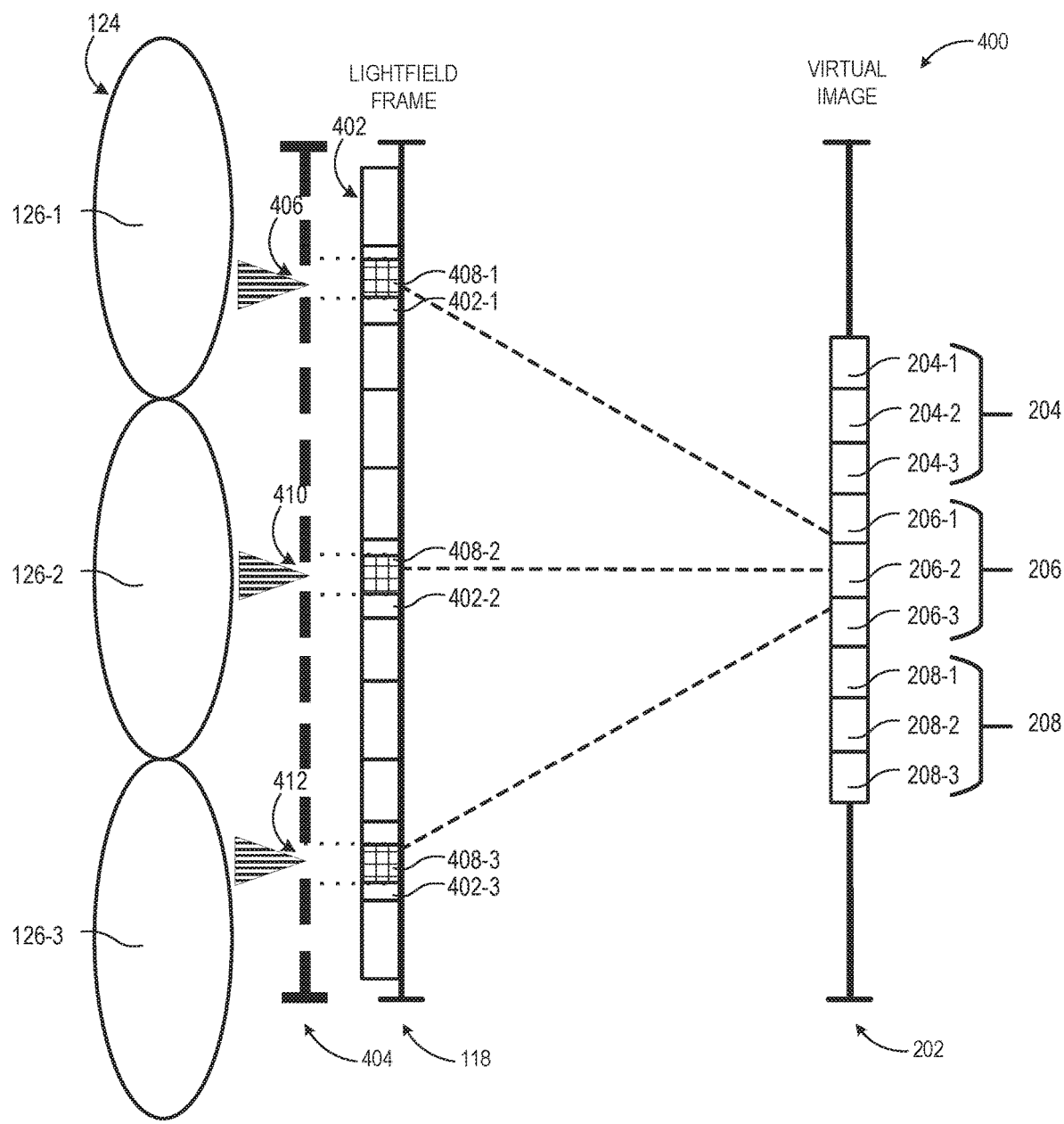
FIG. 4 is a diagram illustrating another example low fill-factor display for use in the near-eye display system of FIG. 1 in accordance with some embodiments.

FIG. 4 illustrates a configuration for a low fill-factor display that may be utilized in the near-eye display system 100 in accordance with some embodiments. As shown by the cross-section view 400, each of the lenslets 126 of the lenslet array 124 serves as a separate "projector" onto an eye of the user (e.g., eye 132 of FIG. 1), with each "projector" overlapping with one or more adjacent projectors in forming a composite virtual image 202 from the array of elemental images displayed at the display panel 118 by light emitting elements 402. As shown in this view, the active refracting area (referred to herein as "fill-factor") is nearly 100%. That is, the ratio of area that directs light towards the lenslet array 124 (i.e., the display panel 118) to the total contiguous area occupied by the occupied by the lenslet array including any gaps nears 100%.

Conventional displays having high fill-factors often overlap a number of elemental images (e.g., 4-6 elemental images) on the virtual image plane. Displays with high fill-factors have overlapping data in multiple elemental images 122 from the virtual image 202. Accordingly, as shown by the cross-section view 400, in this configuration, a pixel aperture mask 404 is positioned between the light emitters of the display panel 118 and the lenslet array 124. It should be noted that the pixel aperture mask 404 does not actually reduce the fill-factor of the display panel 118. The surface area that directs light towards the lenslet array 124 is approximately 100%, similar to the configuration of FIG. 2. However, the additional pixel aperture mask 406 narrows light received at the lenslet array 124 and allows image data to be attributed to only a portion of the area of the light emitting elements 402.

For example, based on the physical dimensions of aperture 404, the light received at lenslet 126-1 past the pixel aperture mask may be attributed to a sub-region 408-1 of light emitting element 402-1. The sub-region 408-1 of light emitting element 402-1 is analogous to FIG. 3's elemental image 122-2 and corresponds to sub-region 206-1 within region 206 of the virtual image 202. Similarly, based on the light received at lenslet 126-2 past the aperture 410 may be attributed to a sub-region 408-2 of of light emitting element 402-2 and light received at lenslet 126-3 past the aperture 412 may be attributed to a sub-region 408-3 of light emitting element 402-3. These sub-regions 408-2 and 408-3 are analogous to FIG. 3's elemental images 122-5, 122-8 and corresponds to sub-regions 206-2, 206-3 within region 206 of the virtual image 202, respectively. Accordingly, the pixel aperture mask 406 allows for greater resolution by reducing the "effective fill-factor" (i.e., fill-factor as experienced from the point of view of the lenslets 126) without changing the actual fill-factor of the display panel 118, thereby increasing spatial resolution of the virtual image 202 while maintaining a larger emitter surface area (e.g., relative to FIG. 3) for increasing output brightness.

It should be noted that the cross-section view 400 does not provide any details regarding the size and shape of the apertures in the pixel aperture mask 406. Those skilled in the art will recognize that various sizes and shapes of apertures may be used without departing from the scope of the present disclosure. For example, substantially square or rectangular apertures may be used. It should further be noted that although the cross-section view 400 illustrates a space between the pixel aperture mask 406 and the display panel 118 and the lenslet array 124, the spaces are provided for clarity and relational purposes. For example, in various embodiments, the pixel aperture mask 406 may be disposed to be in direct contact with the display panel 118 or the lenslet array 124, or applied to a glass surface that is in direct contact with the display panel 118 or the lenslet array 124 without departing from the scope of the present disclosure.

Figure 5:
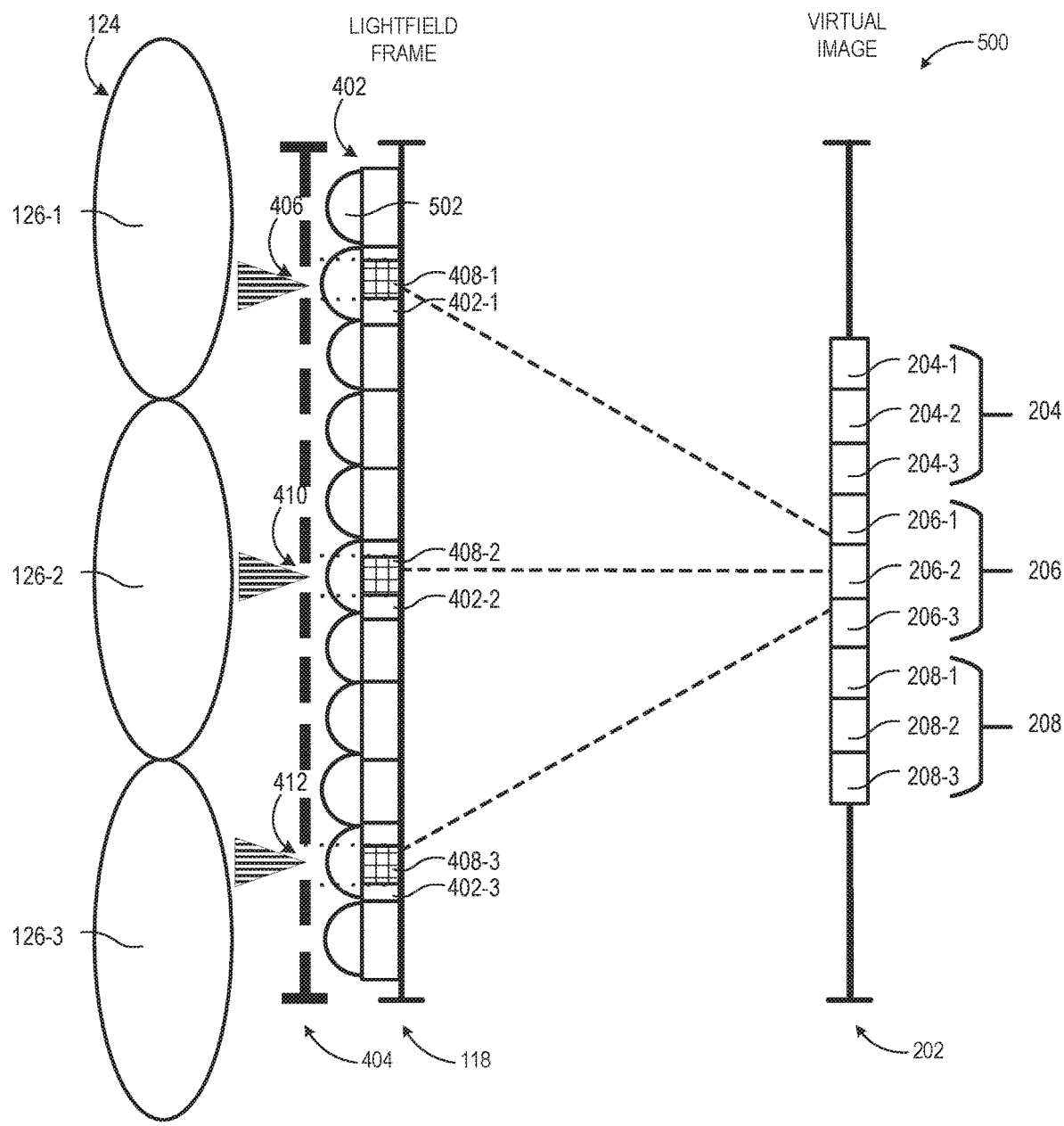
FIG. 5 is a diagram illustrating another example low fill-factor display for use in the near-eye display system of FIG. 1 in accordance with some embodiments.

FIG. 5 illustrates another configuration for a low fill-factor display that may be utilized in the near-eye display system 100 in accordance with some embodiments. As shown by the cross-section view 500, each of the lenslets 126 of the lenslet array 124 serves as a separate "projector" onto an eye of the user (e.g., eye 132 of FIG. 1), with each "projector" overlapping with one or more adjacent projectors in forming a composite virtual image 202 from the array of elemental images displayed at the display panel 118 by light emitting elements 402. As shown in this view, the active refracting area (referred to herein as "fill-factor") is nearly 100%. That is, the ratio of area that directs light towards the lenslet array 124 (i.e., the display panel 118) to the total contiguous area occupied by the occupied by the lenslet array including any gaps nears 100%.

Conventional displays having high fill-factors often overlap a number of elemental images (e.g., 4-6 elemental images) on the virtual image plane. Displays with high fill-factors have overlapping data in multiple elemental images 122 from the virtual image 202. Accordingly, as shown by the cross-section view 500 and as previously discussed with respect to FIG. 4, a pixel aperture mask 404 is positioned between the light emitters of the display panel 118 and the lenslet array 124. It should be noted that the pixel aperture mask 404 does not actually reduce the fill-factor of the display panel 118. The surface area that directs light towards the lenslet array 124 is approximately 100%, similar to the configuration of FIG. 2. However, the additional pixel aperture mask 406 narrows light received at the lenslet array 124 and allows image data to be attributed to only a portion of the area of the light emitting elements 402.

For example, based on the physical dimensions of aperture 404, the light received at lenslet 126-1 past the pixel aperture mask may be attributed to a sub-region 408-1 of light emitting element 402-1. The sub-region 408-1 of light emitting element 402-1 is analogous to FIG. 3's elemental image 122-2 and corresponds to sub-region 206-1 within region 206 of the virtual image 202. Similarly, based on the light received at lenslet 126-2 past the aperture 410 may be attributed to a sub-region 408-2 of of light emitting element 402-2 and light received at lenslet 126-3 past the aperture 412 may be attributed to a sub-region 408-3 of light emitting element 402-3. These sub-regions 408-2 and 408-3 are analogous to FIG. 3's elemental images 122-5, 122-8 and corresponds to sub-regions 206-2, 206-3 within region 206 of the virtual image 202, respectively. Accordingly, the pixel aperture mask 406 allows for greater resolution by reducing the "effective fill-factor" (i.e., fill-factor as experienced from the point of view of the lenslets 126) without changing the actual fill-factor of the display panel 118, thereby increasing spatial resolution of the virtual image 202 while maintaining a larger emitter surface area (e.g., relative to FIG. 3) for increasing output brightness.

It should be noted that although the configuration illustrated in FIG. 4 provides an increased emitter surface area for increasing output brightness relative to the configuration of FIG. 2, the presence of pixel aperture mask 406 does decrease the brightness by $\eta^2$, where $\eta = NA_{lenslet}/NA_{elem}$ ($NA_{lenslet}$=numerical aperture of the lenslet and $NA_{elem}$=numerical aperture of the elemental image). Accordingly, the configuration of FIG. 5 further includes a micro-lens 502 positioned in front of each light emitting element 402. As illustrated in FIG. 5, the micro-lenses 502 are disposed between the display panel 118 and the pixel aperture mask 406, such that the micro-lenses 502 are configured to focus light emitted by the light emitting elements 402 past the apertures. Accordingly, combining the micro-lenses 502 with the pixel aperture mask 406 allows for greater resolution by reducing the "effective fill-factor" (i.e., fill-factor as experienced from the point of view of the lenslets 126) without changing the actual fill-factor of the display panel 118, thereby increasing spatial resolution of the virtual image 202 while using the micro-lenses 502 to focus light emitted from the larger emitter surface area (e.g., relative to FIG. 3) for increasing output brightness and light throughput to the lenslets 126.

It should be noted that the cross-section view 500 does not provide any details regarding the size and shape of the apertures in the pixel aperture mask 406. Those skilled in the art will recognize that various sizes and shapes of apertures may be used without departing from the scope of the present disclosure. For example, substantially square or rectangular apertures may be used. It should further be noted that although the cross-section view 500 illustrates a space between the pixel aperture mask 406 and the display panel 118 and the lenslet array 124, the spaces are provided for clarity and relational purposes. For example, in various embodiments, the pixel aperture mask 406 may be disposed to be in direct contact with the display panel 118 or the lenslet array 124, or applied to a glass surface that is in direct contact with the display panel 118 or the lenslet array 124 without departing from the scope of the present disclosure.

Figure 6:
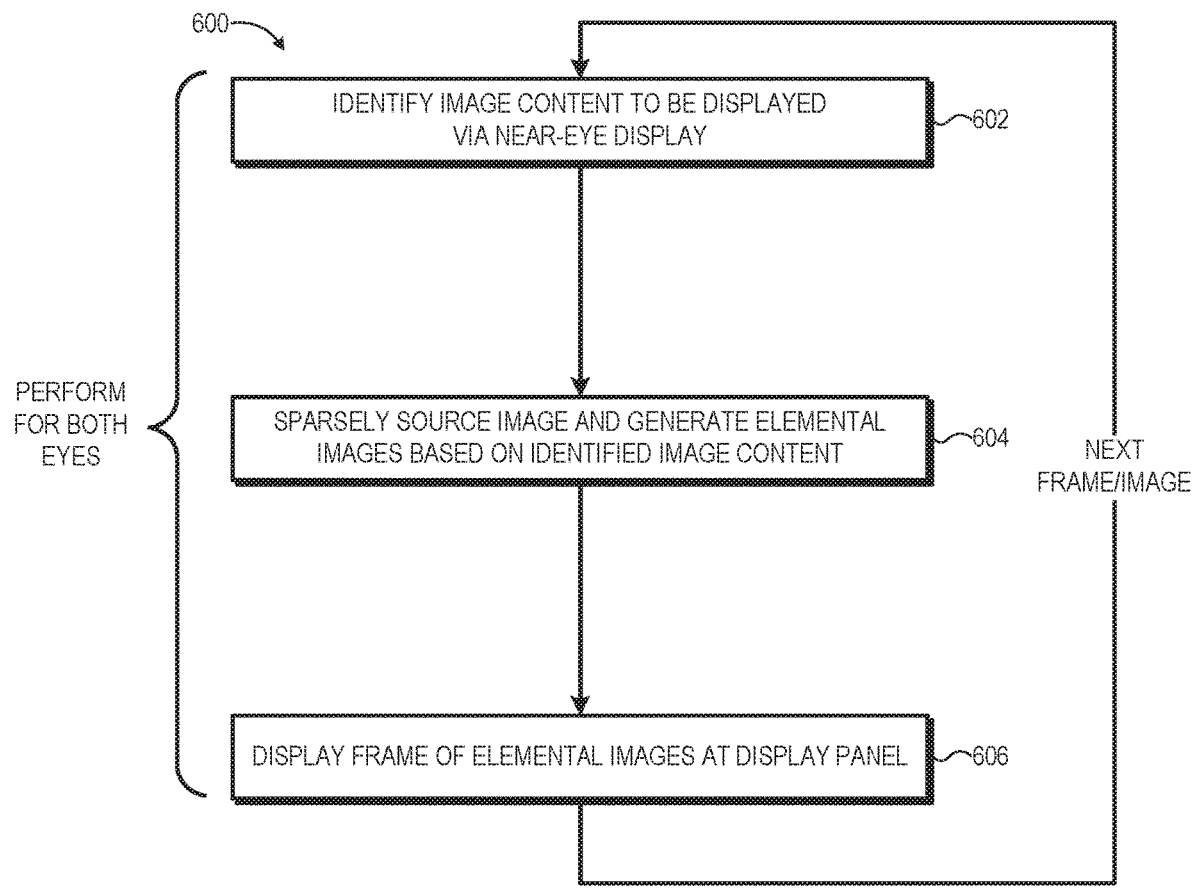
FIG. 6 is a flow diagram illustrating an example of a method of sparse sampling for rendering lightfield frames with increased resolution in the near-eye display system of FIG. 1 in accordance with some embodiments.

FIG. 6 illustrates a method 600 of operation of the near-eye display system 100 for rendering lightfield frames using low fill-factor display panels to generate high resolution lightfield displays in accordance with some embodiments. The method 600 illustrates one iteration of the process for rendering and displaying a lightfield frame for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user.

For a lightfield frame to be generated and displayed, method 600 starts at block 602, whereby the rendering component 104 identifies the image content to be displayed to the corresponding eye of the user as a lightfield frame. In at least one embodiment, the rendering component 104 receives the IMU information 152 representing data from various pose-related sensors, such as a gyroscope, accelerometer, magnetometer, Global Positioning System (GPS) sensor, and the like, and from the IMU information 150 determines a current pose of the apparatus 114 (e.g., HMD) used to mount the displays 110, 112 near the user's eyes. From this IMU information 152, the CPU 136, executing the rendering program 144, can determine a corresponding current viewpoint of the subject scene or object, and from this viewpoint and graphical and spatial descriptions of the scene or object provided as rendering information 148, determine the imagery to be rendered.

At block 604, the rendering program 144 manipulates the CPU 136 to sparsely sample the source object (e.g., virtual image 202 of FIG. 2) in the spatial domain and generate elemental images based on the determination in block 602 of imagery to be rendered. As discussed above, each elemental image represents an image or view of an object or scene from a corresponding perspective or virtual camera position, such as determined in block 602. In various embodiments, sparsely sampling the source object includes minimizing the amount of image data within each generated elemental image that overlaps with image data within other elemental images at the virtual image plane.

Figure 7:
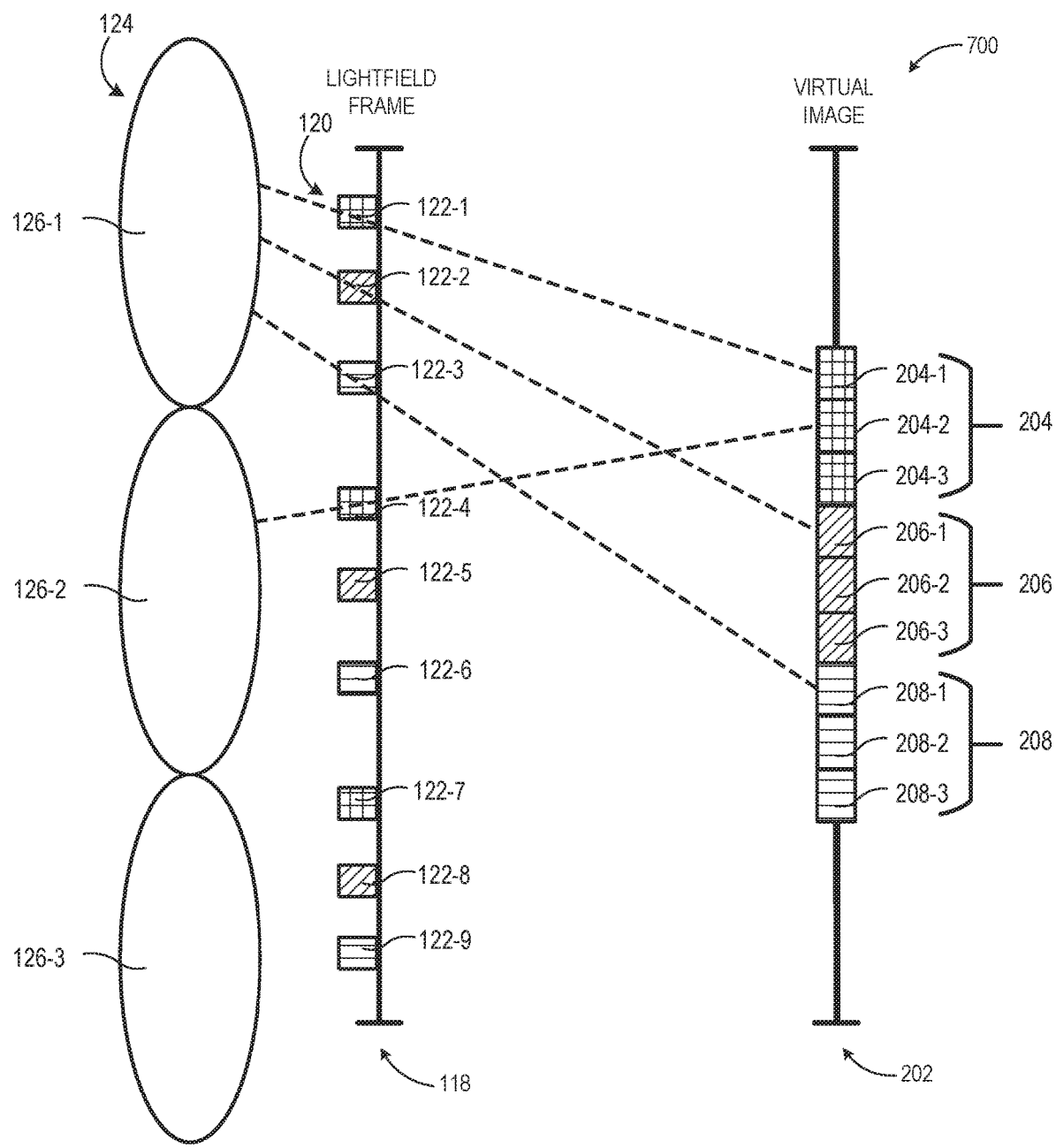
FIG. 7 is a diagram illustrating an example sparse sampling operation for rendering lightfield frames in accordance with some embodiments.

For example, referring now to FIG. 7, illustrated is a diagram of a cross-section view 700 of a low fill-factor display (e.g., embodiment of FIG. 3) configured to sparsely sample the virtual image for display. As shown, each of the lenslets 126 of the lenslet array 124 serves as a separate "projector" onto an eye of the user (e.g., eye 132 of FIG. 1), with each "projector" overlapping with one or more adjacent projectors in forming a composite virtual image 202 from elemental images displayed at the display panel 118. As shown in this view, the fill-factor is approximately 33%. That is, the ratio of area that directs light towards the lenslet array 124 (i.e., the light emitting elements, such as pixels 122, of the display panel 118) to the total contiguous area occupied by the occupied by the lenslet array including any gaps is approximately 33%.

As illustrated, the pixels 122 represented by a given pattern are samples from the same local region (e.g., one of local regions 204-206) of the source virtual image 202. However, the pixels 122 are not sampled in exactly the same location, and therefore have unique intensity values (i.e. information content). For example, the pixel 122-1 corresponds to a sparse sampling of sub-region 204-1 and pixel 122-4 corresponds to a sparse sampling of sub-region 204-2. Although both pixels 122-1 and 122-4 both sample in the same local region 204, they capture different perspectives and have unique intensity values relative to each other. Further, as illustrated, pixel 122-2 corresponds to a sparse sampling of sub-region 206-1 and pixel 122-3 corresponds to a sparse sampling of sub-region 208-1. Accordingly, an elemental image rendered based on the pixels 122-1, 122-2, and 122-3 for presentation via lenslet 126-1 will contain unique data relative to, for example, an elemental image rendered based on pixels 122-4, 122-5, and 122-6 for presentation via lenslet 126-2 (as opposed to, for example, the display of FIG. 2 in which all three displayed lenslets receives more than one copy of the same virtual image data at the various lenslets).

Similarly, FIGS. 4-5 and their associated disclosure also discuss the generation of elemental images with greater spatial resolution and less overlap in image data between elemental images. In an alternative embodiment, the rendering program 144 manipulates the CPU 136 to sparsely sample the source object (e.g., virtual image 202 of FIG. 2) in the spatial domain and generate elemental images having no overlap in image data at the virtual image plane, thereby maximizing the efficiency of the system. The GPU subsequently renders the lightfield frame at block 606 and provides the lightfield frame to the corresponding one of the computational displays 110, 112 for display to the eye 132 of the user. Additionally, in various embodiments, the sparse sampling rendering operations described herein may be combined with varifocal lenses to shift the virtual image plane to achieve additional improvements to resolution of displayed imagery.

Figure 8:
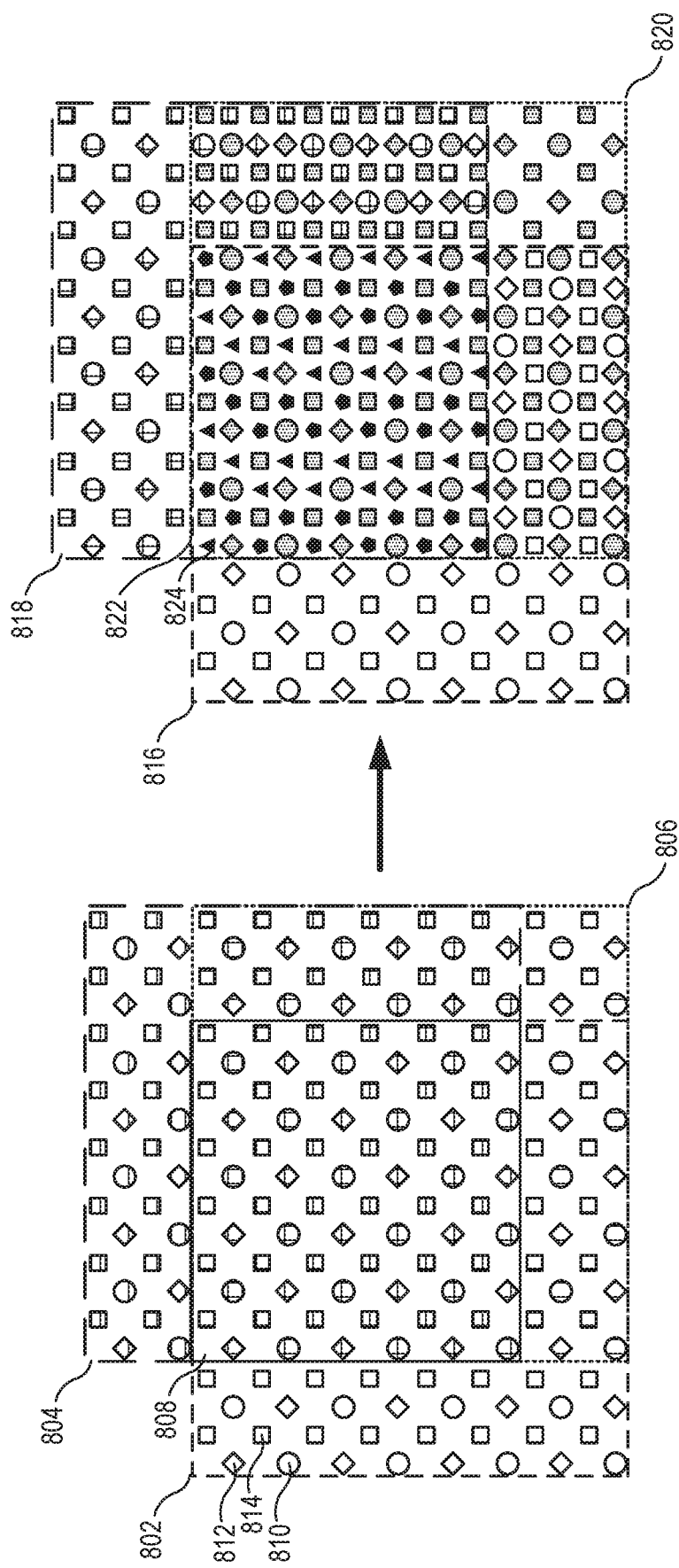
FIG. 8 is a diagram illustrating an example of light field super-resolution in accordance with some embodiments.

FIG. 8 is a diagram illustrating an example of light field super-resolution in accordance with some embodiments. With light field displays, the image perceived at, for example, the retina of eye 132 of FIG. 1 of the user, is the composite of a plurality of elemental images. Each of the elemental images passes through a lenslet (e.g., lenslet 126 of FIG. 1) within an array (e.g., array 124 of FIG. 1) and overlap to form the overlapping, composite image. As illustrated, retinal images of elemental images 802, 804, and 806 overlap to form an aggregate lightfield pixel grid 808 with overlapping subpixel elements (e.g., red subpixels 810, blue subpixels 812, and green subpixels 814). When the lenslet array 124 is aligned with the pixel lattice grid, the retinal images of the subpixel elements overlap as shown.

In some embodiments, rotation of the lenslet array 124 relative to the display panel 118 results in light field super-resolution. As the display pixels (i.e., the sample grid) are rotated relative to the lenslet array 124 (e.g., either through rotation of the lenslet array 124 and/or the display panel 118), the virtual image of the subpixels from each of the neighboring elemental images will no longer perfectly overlap. A rotation is a compound translation (e.g., x- and y-axis translation of subpixel position), thereby causing a deviation in the virtual images perceived at the retina. As shown, the rotation is modeled as a subpixel shift in the x- and y-axis positions of one elemental image's pixel grid relative to its neighbors' grids.

At some angle, the subpixels will be perfectly interleaved. As illustrated, after rotation, the pixel grids of elemental images 816, 818, and 820 become separated by a half pixel in one direction and an integer number of half pixels in the other direction, resulting in the interlacing of adjacent elemental image's pixels. Image information is thus steered from adjacent elemental images into normally black areas of the composite retinal image 822 (e.g., due to non-emissive portions of the display between subpixels), thereby creating an increase of 1/N times the resolution, where N represents the number of elemental images sharing same pixel (e.g., the redundancy factor).

In the embodiment of FIG. 8, by displacing the virtual images of nominally overlapping pixels by a distance of half the pixel pitch away from each other, the resulting composition retinal image 822 has a resolution which is increased by a factor of two. The additionally perceived pixels are contributions from adjacent elemental images that provide additional image information. For example, subpixel 824 is the result of overlapping a blue subpixel and a green subpixel from two different elemental images.

Although described here in the example context of rotating two elemental images in each direction, those skilled in the art will recognize that adding more elemental images will fill in the gaps for the color channels. The super-resolution by shifting rotation of the lenslet array 124 relative to the display panel 118 may be extended to increases in resolution by a factor of 1/(fill-factor). Thus, by adjusting the rendering function to resample the source image according to the rotated virtual sampling grids on the retina, a composite retinal image of greater resolution and less redundancy is generated relative to when retinal images of the subpixel elements overlap (e.g., the lenslet array 124 is aligned with the pixel lattice grid).

In other embodiments, super-resolution by interleaving of subpixels may also be achieved by shifting lenslet-display distance (e.g., z-axis distance between the lenslet array 124 relative to the display panel of FIG. 3) instead of the x- and y-axis translation due to lenslet-display rotation. To achieve interleaved conditions, the lenslet-display distance is shifted by an amount $\Delta z = f_a^2 \Delta \Phi' = f_a p/d_a N$, where $\Delta \Phi'$=diopter distance from interleaved condition to an anomalous image plane, $f_a$=lenslet focal length, p=pixel size, $d_a$=lenslet aperture size, and N=the light field redundancy factor (e.g., 1/(fill-factor)). The diopter distance from interleaved condition to an anomalous image plane $\Delta \Phi'$ is represented by the equation $$\Delta \Phi' = \frac{p/N}{d_a f_a},$$

where p/N=light emitter size, $d_a$=lenslet aperture size, and $f_a$=lenslet focal length. Similarly, the diopter distance between aliased overlap conditions (i.e. anomalous image planes) is represented by the equation $$\Delta \Phi = \frac{p}{d_a f_a},$$

where p=pixel site, $d_a$=lenslet aperture size, and $f_a$=lenslet focal length.

The depth range of the virtual image (e.g., virtual image 202 of FIG. 3) in such interleaved conditions is limited by lenslet depth-of-field or the user's eye accommodation range, such as to block perception of anomalous image reconstructions, which are spaced by $p/(d_a f_a)$, where p=pixel size, $d_a$=lenslet aperture size, and $f_a$=lenslet focal length. Ideally $\eta = NA_{lenslet}/NA_{elem}$ (i.e., $NA_{lenslet}$=numerical aperture of the lenslet and $NA_{elem}$=numerical aperture of the elemental image), but any value $\eta < 1$ will yield resolution gain, given that the fill-factor cannot be >1 and the light field display resolution cannot exceed the native display panel resolution of display panel 118. In this manner, by shifting the relative distance between the lenslet array 124 and the display panel 118, a composite retinal image of greater resolution is generated.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-eye display system comprising:
a rendering component comprising at least one processor to generate an array of elemental images based at least in part on a sparse sampling of a source image to decrease an overlap of image data contained within each individual elemental image of the array of elemental images;
a display panel comprising a plurality of light emitting elements to display an integral lightfield frame including the array of elemental images, wherein the sparse sampling of the source image is achieved based on a physical arrangement of each light emitting element of the plurality of light emitting elements; and
a lenslet array to present the integral lightfield frame to a user's eye.

2. The near-eye display system of claim 1, further comprising:
a pixel aperture mask disposed between the display panel and the lenslet array, wherein the pixel aperture mask includes apertures configured to decrease an effective fill-factor of the display panel relative to an actual fill-factor of the display panel.

3. The near-eye display system of claim 2, wherein the apertures of the pixel aperture mask expose a portion of each light emitting element of the display panel for transmitting image data to the lenslet array.

4. The near-eye display system of claim 3, wherein the rendering component is to generate the array of elemental images by:
identifying regions of a source image corresponding to the exposed portion of each light emitting element.

5. The near-eye display system of claim 2, further comprising:
a plurality of micro-lenses disposed between the display panel and the pixel aperture mask, wherein the micro-lenses are configured to increase light throughput to the lenslet array.

6. The near-eye display system of claim 1, wherein the rendering component is to generate the array of elemental images by:
generating the array of elemental images such that each individual elemental image of the array contains unique image data unique relative to all other elemental images in the array.

7. The near-eye display system of claim 6, wherein the lenslet array is rotated relative to the display panel such that virtual images of pixels from each individual elemental image are translated in position relative to all other elemental images in the array.

8. The near-eye display system of claim 7, wherein the virtual images of pixels from each individual elemental image are interleaved between virtual images of pixels of one or more neighboring elemental images in the array.

9. A rendering system comprising:
at least one processor;
an input to receive data from at least one pose-related sensor, the data indicating a current viewpoint of a subject object relative to a near-eye display panel; and
a storage component to store a set of executable instructions, the set of executable instructions configured to manipulate the at least one processor to render an integral lightfield frame comprising an array of elemental images based at least in part on a sparse sampling of the current viewpoint of the subject object to decrease an overlap of image data contained within each individual elemental image of the array of elemental images, wherein rendering the integral lightfield frame comprises identifying portions of the near-eye display panel exposed by a pixel aperture mask that includes apertures configured to decrease an effective fill-factor of the near-eye display panel relative to an actual fill-factor of the display panel.

10. The rendering system of claim 9, wherein the set of executable instructions are configured to manipulate the at least one processor to render the integral lightfield frame by:
attributing a portion of the subject object to one or more elemental images to be displayed by light emitting elements of the near-eye display panel.

11. The rendering system of claim 10, wherein the set of executable instructions are configured to manipulate the at least one processor to render the integral lightfield frame by:
determining a portion of each of the light emitting elements exposed by the pixel aperture mask; and attributing portions of the subject object to one or more elemental images to be displayed by the exposed portions of the light emitting elements of the near-eye display panel.

12. The rendering system of claim 9, wherein the set of executable instructions are configured to manipulate the at least one processor to render the integral lightfield frame by:
   generating the array of elemental images such that each individual elemental image of the array contains unique image data unique relative to all other elemental images in the array.

13. The rendering system of claim 9, wherein the set of executable instructions are configured to manipulate the at least one processor to render the integral lightfield frame by:
   sampling the subject object based on each individual elemental image of the array of elemental images having virtual images of pixels interleaved between virtual images of pixels of one or more neighboring elemental images in the array.

14. In a near-eye display system, a method comprising:
   determining, using at least one pose-related sensor, a current viewpoint of a subject object relative to a display panel of the near-eye display system;
   generating an array of elemental images forming an integral lightfield frame based on a sparse sampling of the current viewpoint of the subject object to decrease an overlap of image data contained within each individual elemental image of the array, wherein the sparse sampling is achieved based on a physical arrangement of each light emitting element of a plurality of light emitting elements of the display panel;
   rendering the array of elemental images at a position within the integral lightfield frame; and
   displaying the integral lightfield frame at the display panel, comprising displaying portions of the integral lightfield using respective light emitting elements of the plurality of light emitting elements of the display panel, wherein the plurality of light emitting elements are separated by a plurality of gaps.

15. The method of claim 14, wherein generating the array of elemental images comprises:
   identifying an exposed portion of each of the plurality of light emitting elements of the display panel exposed by apertures in a pixel aperture mask.

16. The method of claim 15, wherein generating the array of elemental images comprises:
   identifying regions of a source image corresponding to the exposed portion of each light emitting element.

17. The method of claim 15, wherein displaying the integral lightfield frame at the display panel comprises:
   focusing light representing the array of elemental images past the apertures using a set of micro-lenses disposed between the display panel and the pixel aperture mask.

18. The method of claim 17, further comprising:
   rotating the set of micro-lenses relative to the display panel such that virtual images of pixels from each individual elemental image are translated in position relative to all other elemental images in the array.

19. The method of claim 18, wherein rotating the set of micro-lenses relative to the display panel interleaves the virtual images of pixels from each individual elemental image between virtual images of pixels of one or more neighboring elemental images in the array.

20. The method of claim 14, wherein generating the array of elemental images comprises:
   generating the array of elemental images such that each individual elemental image of the array contains unique image data unique relative to all other elemental images in the array.

21. The method of claim 14, further comprising:
   increasing spatial resolution in the integral lightfield frame by narrowing the portion of the current viewpoint of the subject object attributable to each of the plurality of light emitting elements of the display panel.

* * * * *